United States Patent
Hui

Patent Number: 5,455,591
Date of Patent: Oct. 3, 1995

[54] PRECISION HIGH SPEED PERSPECTIVE TRANSFORMATION FROM RANGE-AZIMUTH FORMAT TO ELEVATION-AZIMUTH FORMAT

[75] Inventor: Leo H. Hui, Los Angeles, Calif.

[73] Assignee: Hughes Aircraft Company, Los Angeles, Calif.

[21] Appl. No.: 269,407

[22] Filed: Jun. 30, 1994

[51] Int. Cl.[6] ................................ G01S 7/04; G01S 7/18
[52] U.S. Cl. .......................... 342/185; 342/142; 342/144
[58] Field of Search .................................... 342/185, 176, 342/186, 142, 144

[56] References Cited

U.S. PATENT DOCUMENTS

| | | | |
|---|---|---|---|
| 4,272,808 | 6/1981 | Hartwig | 364/718 |
| 4,471,449 | 9/1984 | Leavitt et al. | 364/577 |
| 5,357,258 | 10/1994 | May | 342/185 |

*Primary Examiner*—John B. Sotomayor
*Attorney, Agent, or Firm*—Leonard A. Alkov; W. K. Denson-Low

[57] ABSTRACT

A high speed and high precision coordinate transformation process for transforming image data in range-azimuth coordinates to horizontal-vertical display coordinates. The process is comprised of the following steps. Recursion initialization parameters and values for a perspective transformation are computed. Then, range and azimuth values using predetermined recursion equations are computed. A critical range factor using predetermined recursion equations and inverse operation is computed. Range and azimuth results are computed. Display address values are computed. Data is retrieved and the data is stored in display locations. A decision is then made whether the last display address has been stored. Additional display address values are computed until all addresses have been computed, and the process is ended once all addresses have been computed. The process is particularly suited for radar or lidar data, which is typically collected in B-scan format, and transforms the data into a virtual image on a head-up type display, which is in C-scan format. The process takes a display pixel in display coordinates and computes corresponding range and azimuth coordinates. The process uses a recursive form of a 2nd order Taylor series approximation, combined with a precise range calculation term in order to get the high precision and high speed performance. The use of the 2nd order Taylor series approximately allows the matrix calculations to be done at frame initialization for the first pixel and the subsequent pixel to pixel calculations to performed as an incremental addition to the initial values. The use of the recursive form of the approximation reduces the pixel incrementing calculations from nineteen operations per pixel to four operations per pixel. The precision range calculation requires four operations per pixel.

5 Claims, 3 Drawing Sheets

PRECISION HIGH SPEED PERSPECTIVE TRANSFORMATION FROM RANGE-AZIMUTH FORMAT TO ELEVATION-AZIMUTH FORMAT

BACKGROUND

The present invention relates generally to perspective transformations, and more particularly, to a process for performing a perspective transformation from range-azimuth (B-scan) format to elevation-azimuth (C-scan) format.

A product known as a TMC 2301 image resampling sequencer manufactured by TRW LSI Products is available to perform image manipulation in video, graphics, medical, radar, and other image processing systems. It uses a 2nd order Taylor series to perform coordinate transformations from a Cartesian (x,y) format to a C-scan format. Together with another product known as a TMC 2330 coordinate transformer available from the same company, which transforms from B-scan format to Cartesian format, an approximation to the transformation from B-scan to C-scan formats can be achieved. These are VLSI products and typically used for real-time image warping, compression, and stretching and the like. They are capable of updating at greater than ten frames per second.

However, these products are not able to provide real-world image conformality for head-up displays, for example, because approximation errors grow to unacceptable levels when pitch and roll attitudes are introduced. Additionally, these products are not able to account for imaging delays. An approach to decouple the roll from the pitch attitude in the approximation requires a second TMC 2301 image resampling sequencer to separately perform the roll transformation. This approach, however, leads to cropping of the image corners and some nonconformality when pitch and roll attitudes are present. A newer TMC 2302 image resampling sequencer has been introduced that uses a 3rd order term in the Taylor series approximation. However, the increased accuracy from this approach does not meet the conformality requirements for processing data for head-up displays, and the like.

The transformation calculations in conventional processes have involved up to 53 arithmetic operations per pixel. To perform the transformation for a full set of display pixels in a near real time rate (>10 frames/sec), it would require a dedicated VLSI image processor of which none are available. Currently available image processors are available to transform data in B-scan to a plan position indicator (PPI) format and have used. 2nd or 3rd order Taylor series approximation to do the transformation, but these suffer tremendous errors if they are used to transform data from B-scan to C-scan formats. These errors are fastest growing at shallower elevation angles and when vehicle roll are present. Other processors are available which try to simplify the transformation by decoupling the roll motion from the pitch and heading motions. An image from this type of processing when in a pitch and roll condition, typically is cropped at the corners and distorted from the real world image. The present invention overcomes the deficiencies of these conventional transformation processes.

Therefore, it is an objective of the present invention to provide an improved process for performing perspective transformations from range-azimuth (B-scan) format to elevation-azimuth (C-scan) format.

SUMMARY OF THE INVENTION

In order to meet the above and other objectives, the present invention is a coordinate transformation process for transforming image data in range-azimuth coordinates to horizontal-vertical display coordinates. The process comprises the following steps. First, recursion initialization parameters and values for a perspective transformation are computed. Then, range and azimuth values using predetermined recursion equations are computed. A critical range factor using predetermined recursion equations and inverse operation is computed. Range and azimuth results are computed. Display address values are computed. Data is retrieved and the data is stored in display locations. A decision is then made whether the last display address has been stored. Additional display address values are computed until all addresses have been computed, and the process is ended once all addresses have been computed.

Thus, a precise and rapid process for transforming image data in range-azimuth coordinates (B-scan) to horizontal-vertical display coordinates (C-scan) is provided by the present invention. This process is particularly suited for radar or lidar data, which is typically collected in B-scan format, and transforms the data into a virtual image on a head-up type display, which is in C-scan format. The process takes a display pixel given in display coordinates and computes corresponding range and azimuth coordinates. The transformation process is novel in that it may be performed in as little as four arithmetic operations per pixel and up to eight operations per pixel depending on the degree of precision desired, while precisely accounting for dynamic effects such as data collected in an airborne vehicle with changing velocities and altitudes and for effects due to system delays. Parallax effects due to different locations between a data sensor (radar or lidar), a dynamics sensor (e.g. inertial navigation system), and the display are precisely accounted for. The process uses a recursive form of a 2nd order Taylor series approximation, combined with a precise range calculation term in order to get the high precision and high speed performance. The process is fast enough to allow conventional general purpose signal processors to be used instead of relying on dedicated VLSI chips to perform the transformation.

The process allows the display of an airborne radar image on to a head-up display in real time. This requires that the image be updated rapidly and that it must conform to the real world. The present transformation process is key in providing a fast image update, minimizing the effects due to delays in the data collection, processing, and display, and providing image conformality. The transformation process involves matrix calculations for the vehicle's pitch, roll, and heading attitudes and attitude rates, vehicle altitude and velocity, sensor directions, sensor to display displacements (i.e. lever arms), delay terms, and display scaling terms. Given this input data, the present process employs the use of a recursive form of a 2nd order Taylor series approximation as a first key process. The use of the 2nd order Taylor series approximation allows the matrix calculations to be done at frame initialization for the first pixel and the subsequent pixel to pixel calculations be performed as an incremental addition to the initial values. The use of the recursive form of the approximation reduces the pixel incrementing calculations from nineteen operations per pixel to four operations per pixel. The second key process is the precision range calculation, which is required to minimize errors at shallow elevation angles during a roll condition. This process requires four operations per pixel. Thus, the transformation process is reduced from 53 operations per pixel to eight operations per pixel using the present invention, which provides a 6.6 times improvement. This reduction makes it possible for the same processing to be done by a general purpose processor, rather than requiring a specially developed image processor.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
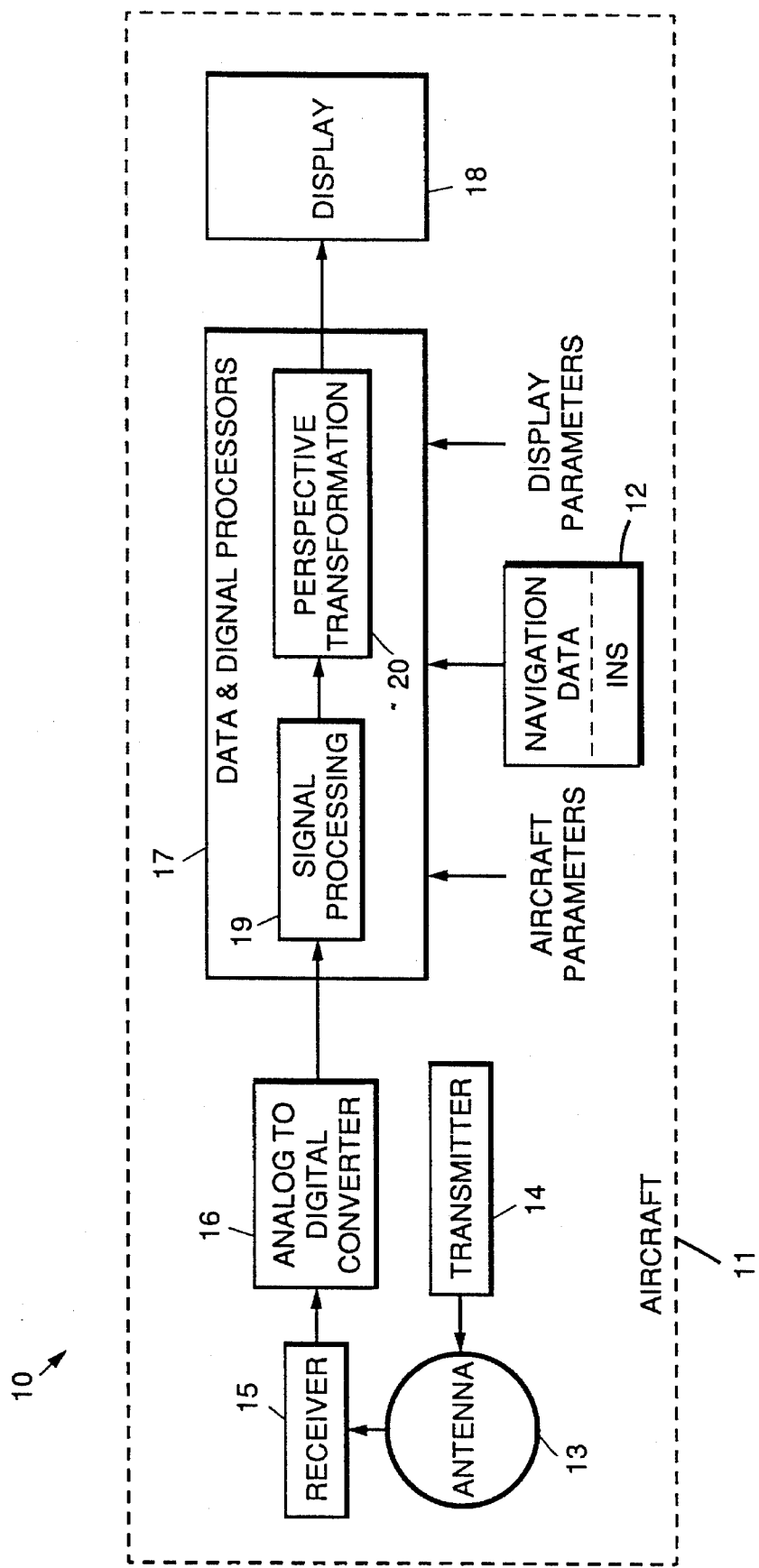
FIG. 1 shows a block diagram of a sensor system in which a coordinate transformation process in accordance with the principles of the present invention is employed.

Referring to the drawing figures, FIG. 1 shows a block diagram of a sensor system 10 in which a coordinate transformation process 30 in accordance with the principles of the present invention is employed. The sensor system 10 is disposed on an aircraft 11 (generally shown) that includes an inertial navigation system (INS) 12 that provides navigation data. The sensor system 10 is comprised of an antenna 13 and a transmitter 14 and receiver 15 coupled to the antenna 13 for transmitting and receiving radar signals. An analog-to-digital converter 16 is coupled to the receiver 15 for digitizing received radar signals. A data and signal processor 17 is coupled to the analog-to-digital converter 16 and is adapted to process the received radar signals to produce an image. The data and signal processor 17 has aircraft parameters, navigation data and display parameters coupled to it from the aircraft 11 and the inertial navigation system 12 and by an operator from a keyboard, for example, for use by thereby. The data and signal processor 17 is coupled to a display 18 that is used to display the radar image to the operator. The data and signal processor 17 is comprised of a signal processor 19 and a perspective transformation processor 20 in accordance with the present invention.

Figure 2:
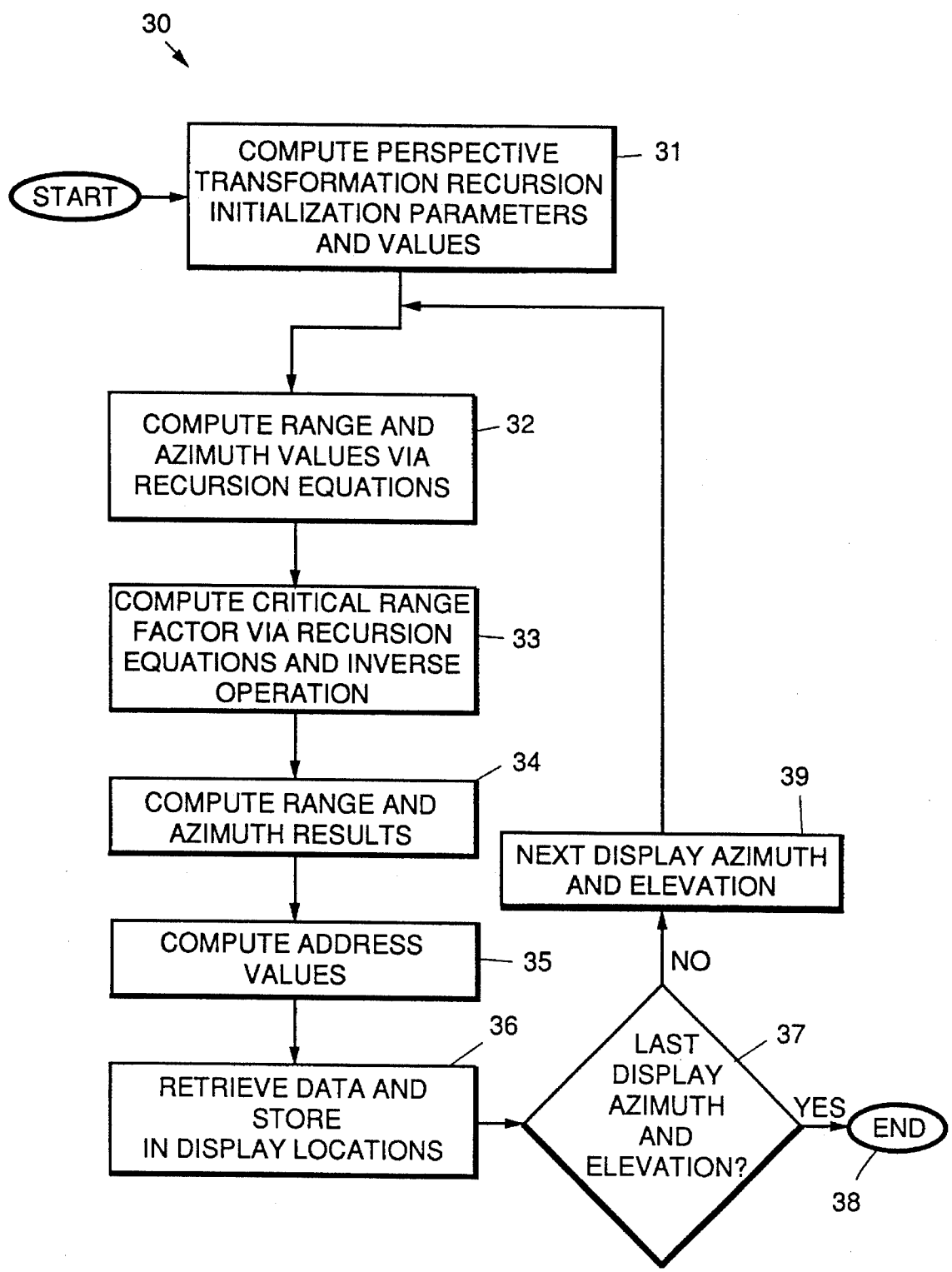
FIG. 2 shows a flow diagram of the coordinate transformation process in accordance with the principles of the present invention employed in the sensor system of FIG. 1.

FIG. 2 shows a flow diagram of the coordinate transformation process 30 in accordance with the principles of the present invention employed in the perspective transformation processor 20 of the sensor system 10 of FIG. 1. The coordinate transformation process 30 comprises the following steps. The first step is to compute recursion initialization parameters and values for the perspective transformation, as is indicated in step 31. The next step is to compute range and azimuth values using predetermined recursion equations, as is indicated in step 32. The next step is to compute a critical range factor using predetermined recursion equations and inverse operation, as is indicated in step 33. The next step is to compute range and azimuth results, as is indicated in step 34. The next step is to compute display address values, as is indicated in step 35. The next step is to retrieve data and store the data in display locations, as is indicated in step 36. A decision is made whether the last display address has been stored, as is indicated in step 37. The process is ended if the last display azimuth and elevation address is determined, as is indicated in step 38. If more addresses need computation, then further display azimuth and elevation points are computed until all data points have been computed, as is indicated in step 39.

Figure 3:
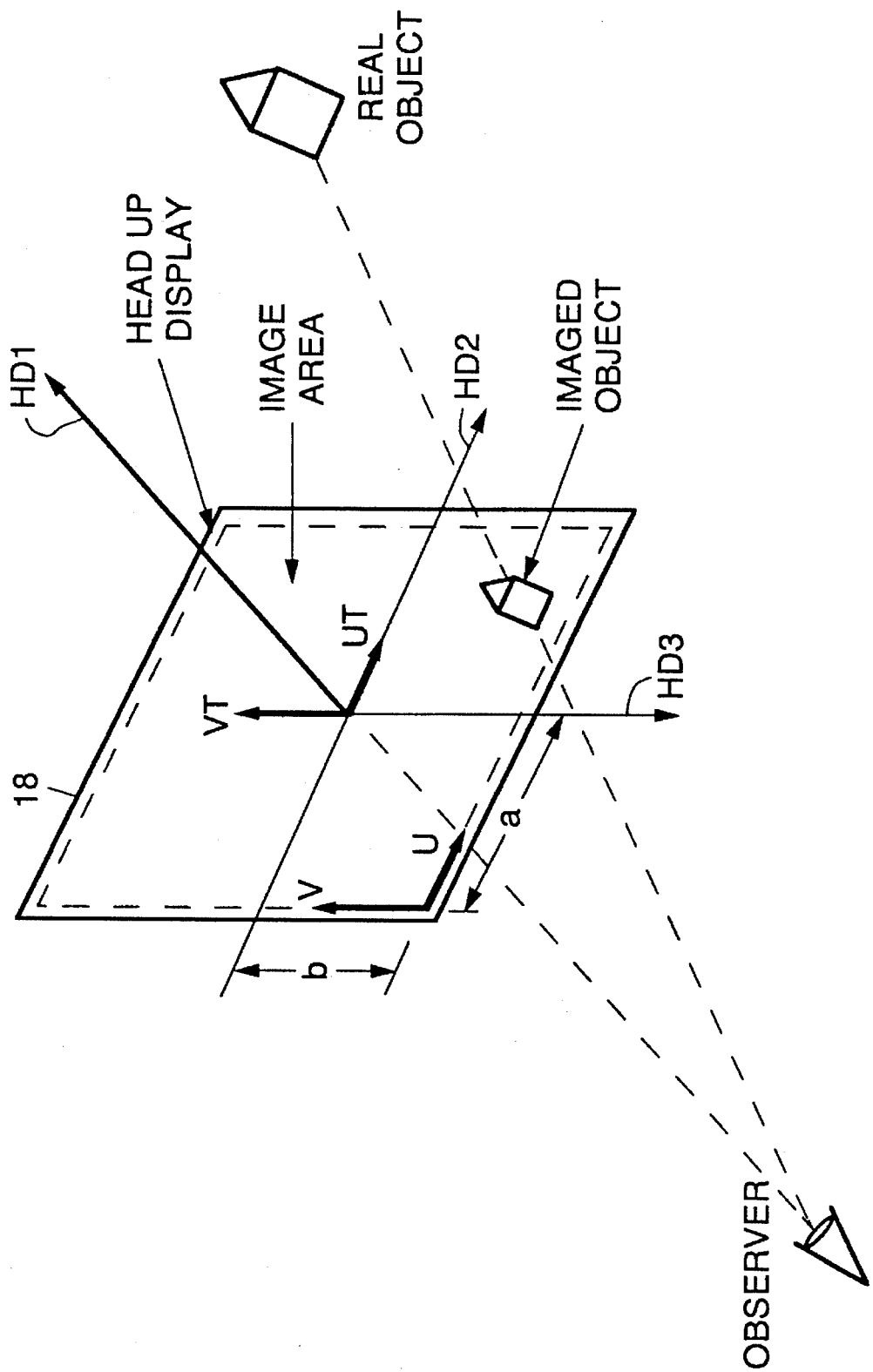
FIG. 3 shows a head-up display coordinate system useful in understanding the coordinate transformation process of the present invention.

The perspective transformation processor 20 implements the coordinate transformation process 30 in accordance with the present invention. The transformation process transforms image data from B-scan format, which is in (range, azimuth) coordinates, into C-scan format, which is in (azimuth, elevation) coordinates as is described below. Reference is made to FIG. 3, which shows a head-up display coordinate system useful in understanding the coordinate transformation process 30, and which shows various terms employed in the equations discussed below.

The basic relationship between coordinates in the B-scan format and those in the C-scan format is given by a range vector equation:

$$RV = [M] \times (HV - LD) + [A] \times DLV.$$

In the above equation, RV is a range vector with coordinates (RV1, RV2, RV3) with RV1 along a fuselage axis of the aircraft, RV2 along the right wing of the aircraft 11, and RV3 in accordance with the right hand rule. RV3 is typically the aircraft altitude above a runway. Range, R, is computed by the square root of the sums of squares of RV1, RV2, and RV3. Azimuth, AZ, is computed by the arctangent of RV2 divided by RV1. [M] is a matrix that accounts for pitch, roll, and heading changes of the aircraft 11 during the collection and display of data, in addition to the antenna elevation angle and a head-up display combiner (a clear panel for display of the image) tilt angle used in the head-up display 18. HV is a head-up display vector with coordinates (HD1, HD2, HD3) with HD1 along the boresight of the head-up display, HD2 to the right and HD3 is down. The display azimuth location, U, is given by HD2 divided by HD1 and scaled by the distance between an eye reference point of the head-up display 18 and the image on the combiner along the boresight direction. The display elevation location, V, is given by −HD3 divided by HD1 and scaled by the distance between the eye reference point of the head-up display 18 and the image on the combiner along the boresight direction. LD is the sensor to display displacements (i.e., lever arms) expressed in the coordinate system of the head-up display 18, and LD1 is along the boresight of the head-up display 18, LD2 is to the right, and LD3 is down. [A] is a submatrix of [M] that accounts for pitch, roll, and heading of the aircraft 11, and elevation of the antenna 13 and during data collection. DLV is an aircraft displacement vector during the data collection and display intervals with DLV1 along north, DLV2 along east, and DLV3 down.

Using the above equation for RV, the associated definitions for range, azimuth, display azimuth, and display elevation, navigation information from the inertial reference system 12 for aircraft pitch, roll, heading, and altitude, and aircraft, antenna, and head-up display parameters, the transformation relationships are computed.

Although the intent of the transformation is to transform from B-scan coordinates to C-scan coordinates, a "backward transformation" approach is used whereby display azimuth and display elevation coordinates are selected and the computations determine the corresponding range and azimuth coordinates. These coordinates are then quantized to reflect discrete cell locations to get the B-scan data. The datum with these range and azimuth coordinates is then stored in the data cell corresponding to the display azimuth and display elevation coordinates. This design approach ensures that each data cell for display has data since the transformation from B-scan to C-scan format is not a one-to-one transformation.

A more elegant but less precise technique is to relate the range and azimuth to the display azimuth and display elevation by two Taylor series, one for range and the other for azimuth. The amount of precision required is determined by the number of terms used in the Taylor series. Analysis indicates that a 2nd order Taylor series is adequate for the azimuth calculation but a much higher order is required for range. The higher order Taylor series is required for range because the range is inversely proportional to the tangent of the elevation angle and proportional to the altitude. At higher altitudes and at shallow elevation angles, the range change per display elevation varies tremendously, leading to large errors if not enough terms are used in the Taylor series. Additionally, aircraft pitch and roll effects greatly distort the range to elevation relationship and so more terms are required in these situations.

The use of many Taylor series terms to compute range is typically inefficient, and defeats the use of Taylor series for simplification. Therefore, instead of using higher order Taylor series terms for the range calculations, a 2nd order Taylor series may be used if the critical factors affecting the range are computed separately in a more precise manner. This is the technique used in the present process 30. The range calculations are performed in two parts, one using the 2nd order Taylor series and the other using a more direct range calculation. The two results are multiplied together to form the final range value.

Additional speed-up of the calculations may be achieved by using a recursive form of the 2nd order Taylor series, and this is used in the process 30 of the present invention. This recursion process requires precalculation of initialization parameters for the range and azimuth series (step 31), and then for each selected new display azimuth and elevation point, the range and azimuth increments are added to the old range and azimuth values to form the new values (step 32). Following the calculation of these values, the critical range factor value is computed (step 33). This value is then multiplied with the new range value from the series to form the range result. The azimuth result is set to equal the new azimuth value (step 34). The range and azimuth results are then quantized to reflect discrete cell locations (step 35) to retrieve the B-scan data (step 36).

The recursion process (step 32) used to arrive at the range and azimuth values requires two arithmetic operations each. The calculation and incorporation of the critical range factors (step 33) require four arithmetic operations. Hence, eight arithmetic operations are required to compute the range and azimuth results (step 34). Compared to 53 arithmetic operations done in the conventional approach, this is a 6.6 times improvement. Four additional arithmetic operations are required to obtain addressable values (steps 35, 36).

The recursion process (step 32) is described in detail below. The recursion process (step 32) has first and second subprocesses. Starting with a one-time calculation of the initial range value (Rb) and initial azimuth value (Azb) for a display azimuth and elevation position (step 31), (U,V), (a,b) increments are added to Rb and Azb for each incremental change in (U,V). Starting values for the increments are also computed one time. Subsequent increment values are computed by adding increment deltas each time. The U and V indices start at (a+1, b+1). With U held constant, the V index is incremented and the second subprocess is performed until the last V value is reached. Then the U index is incremented and the first subprocess is performed, and then the process is repeated. The first subprocess continues until the last U and V values are reached.

More particularly, the first subprocess comprises using the equations:

$$X(U,-1)=X(U-,-1)+DuX(U,-1),$$

$$DuX(U,-1)=DuX(U-,-1)+DuuX,$$

followed by the second subprocess comprising the equations:

$$X(U,V)=X(U,V-1)+DvX(U,V-1),$$

$$DvX(U,V)=DvX(U,V-1)+DvvX$$

where X(U,V) refers to Rb(U,V) for the range value and Azb(U,V) for the azimuth value corresponding to (U,V), DuX(U,V) is the first derivative of X with respect to U evaluated at (U,V), DvX(U,V) is the first derivative of X with respect to V evaluated at (U,V), DuuX is the second derivative of X with respect to U evaluated at (a,b), DuvX is the second derivative of X with respect to U and V evaluated at (a,b), DvvX is the second derivative of X with respect to V evaluated at (a,b), and (a,b) is a preselected reference point for the perspective transformation.

The critical range factors, CRF(U,V), are computed by the recursion process of step 33 as follows. Let P(U,V) represent the inverse of CRF(U,V). Then for each U increment, $$P(U,V)=P(U-1,V)+DuP,$$

and for each V increment, $$P(U,V)=P(U,V-1)+DvP,$$

where DuP is the first derivative of P(U,V) with respect to U, and DvP is the first derivative of P(U,V) with respect to V. When completed, the range value, Rb(U,V), is divided by P(U,V) to form the range result, R(U,V) in step 34. The azimuth value, Azb, is unmodified and forms the azimuth result, Az.

The address values are then computed (step 35). The range address values (AddR(U,V) are computed from the range result (R(U,V)) by $$AddR(U,V)=IPO\{R(U,V)(1/RBS-IR\}$$

where RBS is the range bin size, 1/RBS is a prestored constant and yields the inverse of the range spacing from one range data sample to the next. IR is the initial range at which the range data sample begins. IPO corresponds to the "integer part of".

The azimuth address values (AddAz(U,V)) are computed from the azimuth result (Az(U,V)) by $$(AddAz(U,V))=IPO\{Az(U,V)(1/AzS-IAz\}$$

where AzS is the azimuth bin size, 1/AzS is a prestored constant and yields the inverse of the azimuth spacing from one azimuth data sample to the next. IAz is the initial azimuth at which the azimuth data sample begins. IPO corresponds to the "integer part of".

When completed, the data is retrieved from the corresponding range and azimuth addresses and stored in display locations given by (U,V) (step 36). A check is made to see if the last display (U,V) value is completed (step 37). If so, the process ends (step 38), otherwise the process continues with the next (U,V) value (step 39) and continues until completion.

Thus, the present invention provides a precise and rapid process 30 for transforming image data in range-azimuth coordinates (B-scan) to horizontal-vertical display coordinates (C-scan). The present invention accounts for changes in aircraft attitude, altitude, lateral movement, sensor to display displacements, and delays between data collection and display. The process 30 is particularly suited for radar or lidar data, which is typically collected in B-scan format, and transforms the data into a virtual image on a head-up type display, which is in C-scan format. The process 30 takes a display pixel in display coordinates and computes corresponding range and azimuth coordinates. The transformation process 30 may be performed in as little as four arithmetic operations per pixel and up to eight operations per pixel depending on the degree of precision desired, while precisely accounting for dynamic effects such as data collected in an airborne vehicle or aircraft 11 with changing velocities and altitudes and for effects due to system delays. Parallax effects due to different locations between a data sensor (radar or lidar), a dynamics sensor (e.g. inertial navigation system), and the display 18 are precisely accounted for. The process 30 uses a recursive form of a 2nd order Taylor series approximation, combined with a precise range calculation term in order to get the high precision and high speed performance.

The process 30 allows the display of an airborne radar image on to the head-up display 18 in real time. The transformation process 30 involves matrix calculations for the vehicle's pitch, roll, and heading attitudes and attitude rates, vehicle altitude and velocity, sensor directions, sensor to display displacements, delay terms, and display scaling terms. The use of a recursive form of a 2nd order Taylor series approximation is the first key subprocess in the present process. The use of the 2nd order Taylor series approximation allows the matrix calculations to be done at frame initialization for the first pixel and the subsequent pixel to pixel calculations be performed as an incremental addition to the initial values. The use of the recursive form of the approximation reduces the pixel incrementing calculations to four operations per pixel. The second key subprocess is the precision range calculation, which is required to minimize errors at shallow elevation angles during a roll condition. This process 30 requires four operations per pixel. Thus, the transformation process 30 may be completed with a total of eight operations per pixel, which provides a 6.6 times improvement over conventional processes.

The present process 30 is adapted for use in an Enhanced Vision System developed by the assignee of the present invention, wherein radar data in B-scan format is transformed by the present process into a perspective image that is displayed on a head-up display 18. The image is conformal to the real world and is updated at greater than ten frames per second. The Enhanced Vision System is adapted for use by airline pilots to see a runway and surrounding environment under low visibility conditions. The present process 30 allows the image display 18 to provide a high update rate that remains conformal while using a general purpose processor to perform the processing. The present invention thus reduces the nonrecurring cost of development of this system by not requiring the use of customized VLSI chips. The present invention may be used in many other areas where fast transformations are required, and is adaptable to perform transformations between any two coordinate systems just by changing the input coefficients. For example, the present invention may be used for automotive application if display of sensor imagery or database imagery is required.

Thus there has been described a new and improved process for performing a perspective transformation from range-azimuth (B-scan) format to elevation-azimuth (C-scan) format. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A coordinate transformation process for transforming image data in range-azimuth coordinates to horizontal-vertical display coordinates, said process comprising the steps of:

computing recursion initialization parameters and values for the perspective transformation;

computing range and azimuth values using predetermined recursion equations;

computing a critical range factor using predetermined recursion equations and inverse operation;

computing range and azimuth results;

computing display address values;

retrieving data and store the data in display locations;

deciding whether the last display address has been stored; and computing additional display address values until all addresses have been computed, and ending the process once all addresses have been computed.

2. The coordinate transformation process of claim 1 wherein the step of computing recursion initialization parameters and values for the perspective transformation comprises computing an initial range value (Rb) and initial azimuth value (Azb) for display azimuth and elevation position.

3. The coordinate transformation process of claim 2 wherein the step of computing the range and azimuth values uses a first set of recursion equations:

$$X(U,-1)=X(U-,-1)+DuX(U,-1),$$

$$DuX(U,-1)=DuX(U-,-1)+DuuX,$$

$$DvX(U,-1)=DvX(U-,-1)+DuvX,$$

and a second set of recursion equations:

$$X(U,V)=X(U,V-1)+DvX(U,V-1),$$

$$DvX(U,V)=DvX(U,V-1)+DvvX$$

where X(U,V) refers to Rb(U,V) for a range value and Azb(U,V) for an azimuth value corresponding to (U,V), DuX(U,V) is a first derivative of X with respect to U evaluated at (U,V), DvX(U,V) is a first derivative of X with respect to V evaluated at (U,V), DuuX is a second derivative of X with respect to U evaluated at (a,b), DuvX is a second derivative of X with respect to U and V evaluated at (a,b), DvvX is a second derivative of X with respect to V evaluated at (a,b), and (a,b) is a preselected reference point for the perspective transformation;

and wherein (U,V) increments are sequentially added to Rb and Azb for each incremental change in (U,V), such that with U held constant, V is incremented and the second set of recursion equations is computed until a last V value is reached, and then U is incremented and the first set of recursion equations is computed, and this sequence is repeated until the last U and V values are reached.

4. The coordinate transformation process of claim 3 wherein the step of computing the critical range factor uses the recursion equations:

$P(U,V)=P(U-,V)+DuP$, for each U increment, and $P(U,V)=P(U,V-1)+DvP$, and for each V increment, where P(U,V) represent the inverse of CRF(U,V), DuP is the first derivative of P(U,V) with respect to U, and DvP is the first derivative of P(U,V) with respect to V.

5. The coordinate transformation process of claim 4 wherein the step of computing range and azimuth results comprises dividing the range value, Rb(U,V) by P(U,V) to form the range result, R(U,V).

* * * * *